United States Patent [19]

Stacey et al.

[11] 4,303,972

[45] Dec. 1, 1981

[54] CONTROLLING THE CIRCULATING CURRENT IN NATURALLY COMMUTATED STATIC POWER CONVERTERS

[75] Inventors: Eric J. Stacey, Penn Hills, Pa.; Donal E. Baker, American Twp., Allen County, Ohio; Charles L. Doughman; Ralph D. Jessee, both of Shawnee Township, Allen Co., Ohio

[73] Assignee: Westinghouse Electric Corp., Pittsburgh, Pa.

[21] Appl. No.: 95,820

[22] Filed: Nov. 19, 1979

[51] Int. Cl.³ .................................................. H02P 13/30
[52] U.S. Cl. ......................................... 363/10; 363/63; 363/161
[58] Field of Search ............... 363/9, 10, 63, 160-162; 307/252 P

[56] References Cited

U.S. PATENT DOCUMENTS 3,568,033 3/1971 Gyugyi ............................. 363/161
3,852,654 12/1974 Gyugyi ............................. 363/161

OTHER PUBLICATIONS

Pelly, *Thyristor Phase-Controlled Converters and Cycloconverters*, Wiley-Interscience, 1971, pp. 126-144, 151-160, & 190-198.

*Primary Examiner*—William H. Beha, Jr.
*Attorney, Agent, or Firm*—G. H. Telfer

[57] ABSTRACT

The firing pulses to the nonload carrying bank only of the naturally commutated thyristor power circuit of a static power converter are retarded to reduce or eliminate the interbank circulating current. In one form of the invention, half wave rectified load current signals are summed with the output waveform reference signal applied to the positive and negative bank firing pulse generators in a sense to retard the pulses in the nonload carrying bank. In another form of the invention, the inversion end stops are used to generate the retarded firing pulses in the nonload carrying bank.

11 Claims, 6 Drawing Figures

CONTROLLING THE CIRCULATING CURRENT IN NATURALLY COMMUTATED STATIC POWER CONVERTERS

BACKGROUND OF THE INVENTION

1. Field of the Invention

This invention relates to naturally commutated static power converters and, more particularly, to a method and means for reducing the circulating current in the positive and negative banks of such converters.

2. Prior Art

Cycloconverters are a class of static power frequency changers which generate an electrical output waveform having a frequency which differs from the input frequency. Some cycloconverters generate an output waveform of fixed frequency from an input waveform of variable frequency. Such systems are used for instance in airborne electric power generating systems where the generator is driven by the aircraft engine which operates at various RPM settings while a constant frequency AC voltage is required to operate the aircraft electrical equipment. Another type of cycloconverter generates a variable frequency output signal from a fixed frequency input. Such converters are often used in controlling the speed of AC motors. The term static power converters as used herein is also intended to cover dual converters which generate a DC output of either polarity and are often used in controlling DC motors. For a more thorough understanding of the various types of static power converters, see *Static Power Frequency Changers*, L. Cyugyi and B. R. Pelly, Wiley-Interscience 1976.

The converters to which the invention applies utilize naturally commutated thyristor power circuits. The thyristor (also known as a silicon controlled rectifier or SCR) is a static power switch which, when properly biased, conducts current in a single direction in response to a firing pulse applied to a gate electrode and continues to conduct until the current flow is terminated for a preset interval. In a naturally commutated static power converter, the firing pulses are generated at instants such that the phase voltage of the thyristor which is turned on is sufficient to commutate off the next preceding thyristor. Thus no additional circuitry is required to turn off the thyristors, and they are said to be naturally commutated.

The thyristors of the naturally commutated static power converter are arranged in positive and negative banks which conduct the positive and negative portions of the output current respectively. While the mean value or fundamental component of the output voltage waveforms of the positive and negative thyristor banks are equal, the instantaneous values are not since they are derived from different portions of the source voltage waveforms. Therefore, if the thyristors of each bank are continuously fired, a circulating current will flow between the banks. This portion of the circulating current is referred to as the ripple component and is developed in both the dual converter and the cycloconverter. When the fundamental output current of the converter varies, as it quite clearly does in the case of the cycloconverter which, by definition, generates an AC output and as it may do to a small extent in a dual converter under actual operating conditions, an additional component of the circulating current called the "self-induced" component is generated. For a more complete explanation of these circulating current components and how they are developed see *Thyristor Phase-Controlled Converters & Cycloconverters*, B. R. Pelly, Wiley-Interscience 1971, pages 126-144 and 151-160. As explained therein, the theoretical average value of the "self-induced" circulating current in a cycloconverter is 0.57 times the average output load current. Clearly, this imposes a substantial "wattless" load on the converter and the voltage source, in addition to the "useful" load.

One solution to the above problem is to eliminate the circulating current entirely by a technique known as bank selection in which firing pulses are withheld from the nonload carrying bank. Examples of bank selector schemes are disclosed in U.S. Pat. Nos. 3,568,033 and 3,852,654 and the commonly owned copending application of Stacey, et al., Ser. No. 95,899 filed concurrently herewith. Bank selection is also discussed in the above mentioned books. While bank selection has proved useful in many applications, its use results in unacceptable distortion in the output waveform in applications where there are sizable discontinuities in the output current. Under such circumstances continuous firing of the thyristors in both banks with the attendant circulating current is the only way to achieve an output waveform of suitable quality. In order to reduce the additional load imposed on the system, however, attempts have been made to lower the circulating current such as by adding a DC bias to the firing pulse generating circuit to adjust the firing instants of the banks. However, since this bias affects generation of firing pulses for the load carrying thyristor bank as well as the nonload carrying bank, this arrangement causes considerable distortion in the output waveform. To reduce this distortion, and overall feedback signal from the output to the two bank firing angle control circuits can be used; however, since the feedback can only correct the firing instants of the load supporting bank after it has begun to supply output current and since its effect cannot be instantaneous, some increased distortion will still exist. An example of this type of control is disclosed in U.S. Pat. No. 3,593,106.

A compromise solution described in *Thyristor Phase-Controlled Converters & Cycloconverters*, at pages 190 to 198, provides for simultaneous firing of both banks and therefore the presence of circulating current when the load current is below a certain threshold, and for removing the firing pulses from the nonload carrying bank and thereby eliminating the circulating current when the instantaneous load current is above the threshold level. While this arrangement reduces the peak value of the circulating current appreciably, it introduces its own distortion into the output waveform. The control system disclosed in U.S. Pat. No. 3,568,033 mentioned above utilizes this controlled pulse overlap technique.

It is also known to provide end stop limits for the firing instants of the thyristors in cycloconverters to maintain conditions for natural commutation. A rectification end stop prevents firing of a thyristor too soon and an inversion end stop forces the firing of a thyristor if the control circuit has not produced a firing pulse by a given instant. An example of an end stop control is disclosed in U.S. Pat. No. 3,818,315. The commonly owned copending application of Stacey, Ser. No. 95,803 filed concurrently herewith discloses an end stop control which produces adjustable end stops which not only maintain natural commutation in the converter but also permit the converter to accommodate for load faults. End stop controls are also discussed in *Static Power Frequency Changers* at pages 308-311 and in *Thyristor Phase-Controlled Converters & Cycloconverters* at pages 259-271. The end stop controls of the prior art are applied to both the load carrying and nonload carrying banks of the converter.

Taking into account the limitations of the prior art discussed above, it is a primary object of the present invention to provide an improved, naturally commutated static power converter and a method of operating the same that produce a quality output waveform without imposing a sizable wattless load on the multiphase AC source.

It is also an object of the invention to realize the above object by controlling the interbank circulating current.

It is another object of the invention to control the interbank circulating current by retarding the firing pulses to the nonload carrying bank only.

It is yet another object of the invention to achieve the above objects with a minimum of complexity and hardware required.

SUMMARY OF THE INVENTION

According to the invention, the circulating current in a naturally commutated thyristor power circuit in a static power converter is suppressed by retarding the firing pulses to the nonload carrying thyristor bank independently of the timing of the firing pulses to the other bank. Determination of which bank is carrying the load can be made, for instance, by known schemes for establishing the zero crossing points of the fundamental output current of the converter. Where the thyristor firing pulses are generated as a function of a reference voltage to generate an output waveform which follows the reference voltage, the firing pulses to the nonload carrying thyristor bank can be retarded by summing a bias signal in an appropriate sense with the reference signal when generating the nonload carrying bank firing pulses. The bias signals can be generated appropriately by positive and negative half-wave rectification of the output current waveform. Since the polarity of the output current determines which thyristor bank is carrying the load, the bias signals generated in this fashion are naturally phased properly to apply the bias to the control means only when the particular bank is not carrying the load.

Alternatively, the firing pulses to the nonload carrying bank of the converter can be retarded by using inversion end stops produced by a suitable prior art end stop control to generate the firing pulses for the thyristors in the nonload carrying bank. The firing pulses to the load carrying bank are generated in the normal fashion and the inversion end stop is used to generate the firing pulses in the load carrying bank only in situations where end stops are called for by the prior art end stop controls such as to maintain natural commutation or to handle faults in the load current.

DESCRIPTION OF THE PREFERRED EMBODIMENTS

Figure 1:
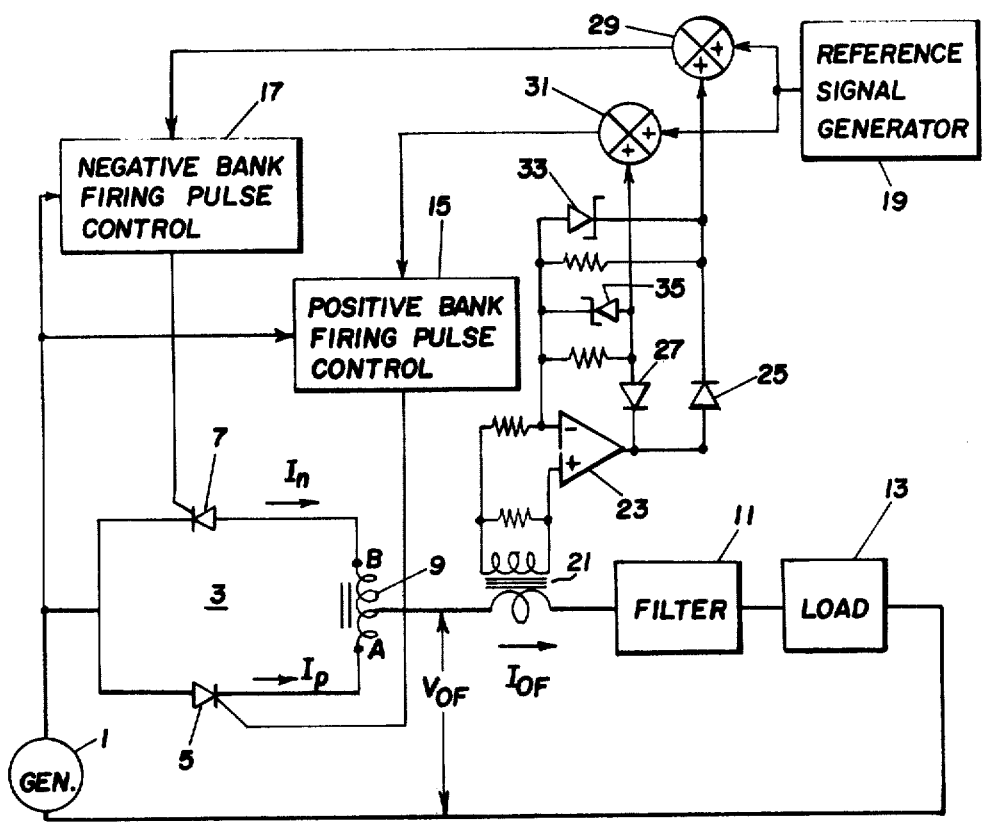
FIG. 1 is a schematic diagram partially in block form of a cycloconverter incorporating the present invention.

The invention will be described as applied to the cycloconverter illustrated in FIG. 1; however, it is to be understood that the invention is equally suitable for use with other static power converters, such as dual converters, in which both positive and negative output currents must be generated. In the cycloconverter of FIG. 1, an AC generator 1 supplies multiphase AC power to the positive and negative banks of a naturally commutated thyristor power circuit 3 represented by the single thyristors 5 and 7 respectively. Although a single line representation has been used for clarity, it will be well understood by those skilled in the art that each thyristor bank includes a thyristor connected to each phase of the AC generator with the outputs of the thyristors in each bank connected together and applied to opposite ends of the circulating current reactor 9. As is common practice, the thyristors in each bank may be divided into pulse groups interconnected by interphase transformers as shown, for instance, in the commonly owned copending Stacey, et al. application, Ser. No. 95,899 filed concurrently herewith. In such an arrangement, the interphase transformers provide the reactance required to regulate the circulating current and a separate reactor is not necessary. The output current developed by the power circuit 3 is passed through the filter 11 to remove the ripple content before being applied to the load 13.

The multiphase voltage of the generator 1 is also applied to the positive and negative bank firing pulse control circuits 15 and 17 which sequentially generate firing pulses for the thyristors of the positive and negative thyristor banks 5 and 7 respectively. The firing pulses for each bank are generated at instants which are phase related to the generator voltages as a function of the magnitude, phase and frequency of a reference voltage generated by a reference signal generator 19 such that an output voltage $V_{OF}$ having a mean value equal to the reference voltage is produced by the power circuit from selected portions of the generator phase voltages. The mean values of the output voltages produced by the positive and negative thyristor banks are equal; however, since thyristors can only conduct in the forward direction, the positive bank supplies the positive half cycles of load current and the negative bank supplies the negative half cycles.

While the mean values of the output voltages produced by the positive and negative thyristor banks are equal, the instantaneous values are not, so that if the thyristors in both banks are fired continuously current develops between the banks of the cycloconverter. In order to control this circulating current, it is necessary to provide some impedance in the circuit such as the circulating current reactor 9 or the interphase transformers mentioned above. Although this ripple current necessitates the inclusion of the circulating current reactor or its equivalent in the cycloconverter power circuit, the additional load placed on the converter and the generator by this circulating ripple current is not large. However, the reactance introduced into the cycloconverter circuit to control the circulating ripple current results in the generation of a "self-induced" circulating current from the alternating component of the output current which, if left unchecked, imposes a substantial additional load on the converter and the generator. Ignoring the ripple voltage for the moment, it can be appreciated that as the alternating cycloconverter output current reaches a peak in one direction and begins decreasing in magnitude, the tendency is for the voltage across the reactor 9 to reverse polarity. For instance, as the current supplied by the positive thyristor bank 5 reaches a maximum value and begins to decline, the voltage at point B in FIG. 1 tends to rise above the voltage at A. However, since the negative thyristor bank 7 is generating the same output voltage as the positive bank, the voltage at point B is clamped by the negative thyristor bank which is thereby forced into conduction. Conversely, when the negative load current reaches its peak and begins to decline, the voltage at point A is clamped by the positive thyristor bank 5 to force the positive bank into conduction. The circulating current which is thus "induced" in the cycloconverter circulates between the banks. The energy which becomes trapped in the reactor 9 is sufficient to maintain a continuous flow of circulating current, except at the instants when the load current reaches the positive and negative peaks.

Figure 2:
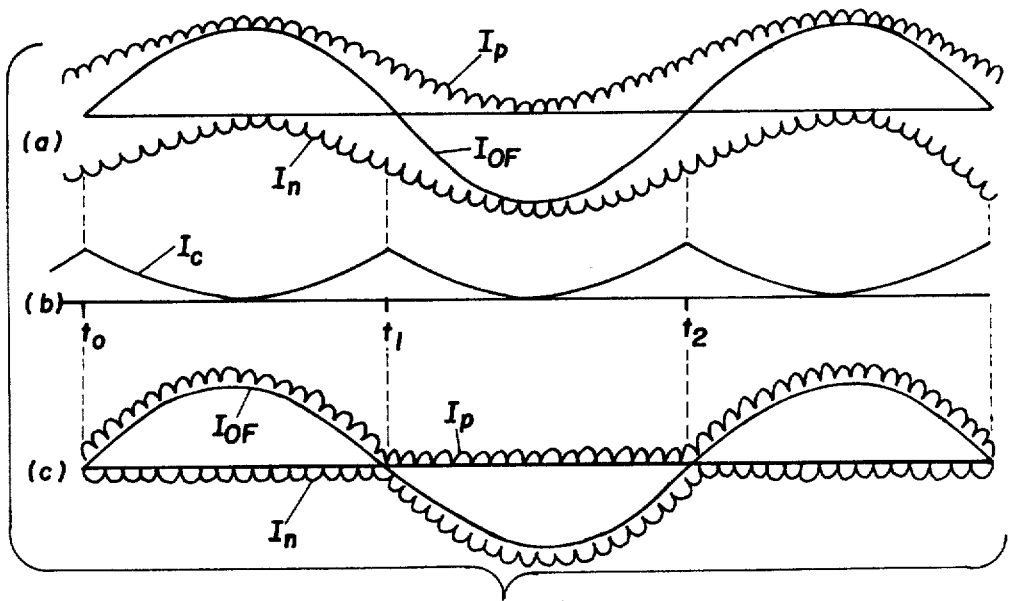
FIG. 2 is a waveform diagram illustrating the operation of the cycloconverter of FIG. 1.

The magnitude of the circulating current developed in the cycloconverter of FIG. 1 without the present invention is illustrated in FIG. 2. In waveform (a) $I_p$ and $I_n$ represent the currents through the positive and negative thyristor banks 5 and 7 respectively while $I_{OF}$ represents the fundamental output current of the converter. The difference between the fundamental output current which is the useful current applied to the load, and the currents in the positive and negative banks is the "self-induced" circulating current $I_c$ which is illustrated in waveform (b). This "self-induced" circulating current is much larger than the ripple circulating current and has a theoretical average value equal to 0.57 times the average output load current supplied by the converter. Thus the converter and the generator would have to have KVA rating equal to more than one and one-half times the load carried by the system in order to support this circulating current. Stating this another way, only about two-thirds of the rated power developed by the system could be delivered to a load. For a more thorough explanation of this "self-induced" circulating current see *Thyristor Phase-Controlled Converters & Cycloconverters,* pages 146 through 161.

Figure 3:
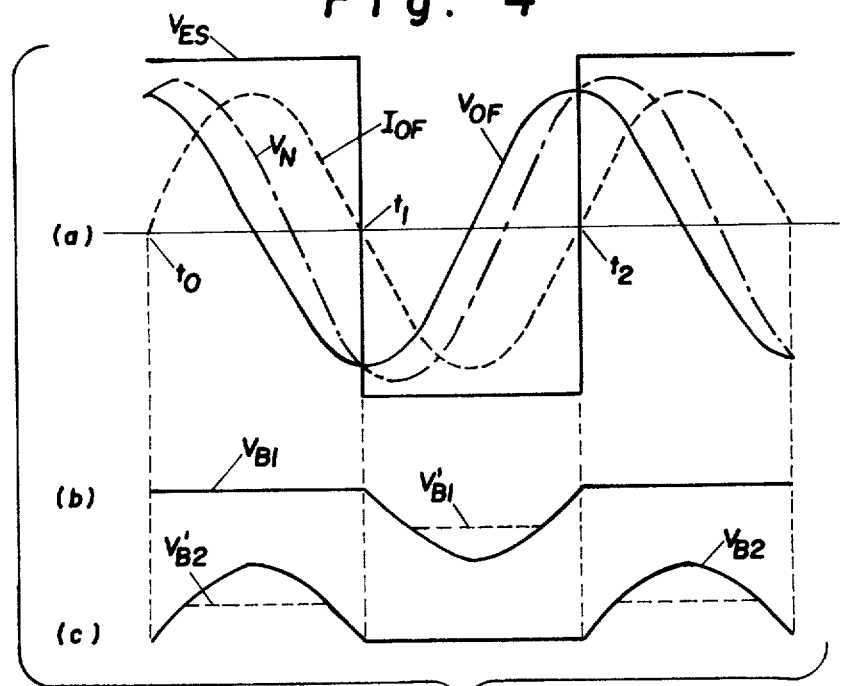
FIG. 3 is a waveform diagram illustrating the effects of the invention on the operation of the cycloconverters of FIGS. 1 and 4.

In order to eliminate the circulating current from the cycloconverter of FIG. 1, a current transformer 21 applies a signal representative of the fundamental output current to an operational amplifier 23. A pair of diodes 25 and 27 connected to the output of op amp 23 generate positive and negative half wave rectified signals which are summed at summing points 29 and 31 respectively with the reference signal generated by reference signal generator 19 to produce modified reference signals which are applied to the negative and positive bank firing pulse generators 17 and 15 respectively. Since the polarity of the fundamental output current $I_{OF}$ is an indication of which thyristor bank is carrying the load current, the arrangement disclosed in FIG. 1 automatically applies a bias to the nonload carrying bank. This is illustrated in FIG. 3 in which $I_{OF}$ in waveform (a) represents the fundamental output current of the cycloconverter for a 90° lagging load, $V_{B1}$ in waveform (b) represents the bias signal applied to the positive bank and $V_{B2}$ in waveform (c) represents the negative bank bias signal. As can be seen from the figure, between the time $t_o$ and $t_1$, when $I_{OF}$ is positive and the load current is being supplied by the positive thyristor bank, the bias signal is applied to the nonload carrying negative bank and conversely, during the time $t_1$ to $t_2$ the nonload carrying positive bank is biased. The effect of the bias on the nonload carrying bank is illustrated in waveform (a) in which $V_{OF}$ represents the fundamental converter output voltage which is also the mean value of the voltage generated by the load carrying bank. The bias signals are summed with the reference signal in a sense such that the output voltage $V_N$ of the nonload carrying bank is more positive than $V_{OF}$ when the negative bank is the nonload carrying bank and more negative when the positive bank is idle. Thus, as shown in FIG. 3 waveform (a), $V_N$ is more positive than $V_{OF}$ between $t_o$ and $t_1$ when the negative bank is the nonload carrying bank and $V_N$ is more negative than $V_{OF}$ between $t_1$ and $t_2$.

The effect of this selective bias on the operation of the circuit of FIG. 1 can be appreciated by referring to that figure, FIG. 3 and waveform (c) of FIG. 2. During the time when the positive bank is supplying the load current between $t_o$ and $t_1$, the potential generated by the positive bank is $V_{OF}$ while the negative bank is at the potential $V_N$. Since $V_N$ is above $V_{OF}$ during this interval, the negative thyristor bank is reverse biased and no circulating current can flow. Similarly, between the time $t_1$ and $t_2$ when the load current is negative, the potential generated by the positive bank is below the potential $V_{OF}$ generated by the negative bank and the positive bank is reverse biased. Thus, as shown in waveform (c) of FIG. 2, the negative bank current $I_n$ is basically zero except for a ripple component between $t_o$ and $t_1$ and the current $I_p$ supplied by the positive bank has a mean value equal to the fundamental output current $I_{OF}$ plus the ripple current. If desired, zener diodes 33 and 35 can be provided as shown in FIG. 1 to clamp the bias voltages to the voltages $V_{B2}'$, and $V_{B1}'$ as shown in waveforms (b) and (c) of FIG. 3. If sufficient bias is summed with the reference voltage, the ripple component of the circulating current can be eliminated also.

The firing pulses to the nonload carrying thyristor bank can also be retarded by utilizing the inverter end stops generated by the end stop control usually provided in a cycloconverter. In the prior art converters, the end stops are applied to both the positive and negative banks to maintain conditions for natural commutation and, as disclosed in the commonly owned copending Stacey application, Ser. No. 95,803 filed concurrently herewith, they can also be used to protect against fault currents.

Figure 4:
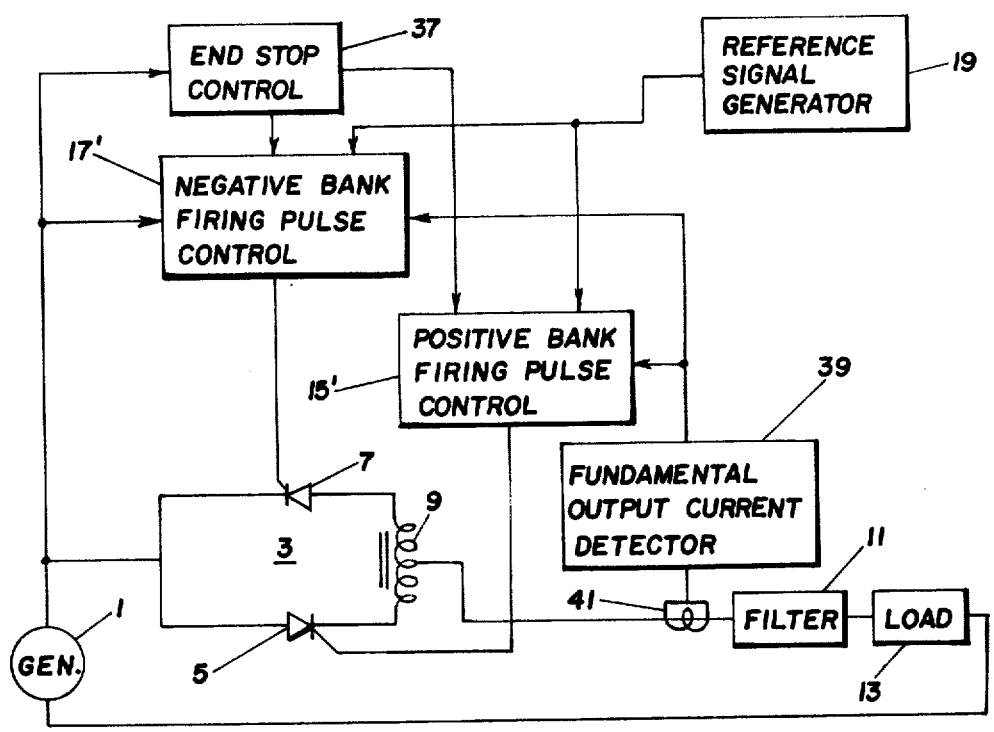
FIG. 4 is a schematic diagram in block form of a cycloconverter incorporating a modification of the present invention.

A cycloconverter modified to use the end stop control to retard the firing pulses in the nonload carrying bank is illustrated in block form in FIG. 4. As in the converter of FIG. 1, the outputs of the multiphase AC generator 1 are applied to a naturally commutated power circuit 3 having positive and negative thyristor banks represented in the drawing by the single thyristors 5 and 7 respectively. The output of the power circuit 3 which is generated at the center tap of circulating current reactor 9 is passed through a filter 11 before being applied to a load 13. Firing of the thyristors in the positive and negative thyristor banks is controlled by the positive and negative bank firing pulse generators 15' and 17' respectively in appropriate phase relation to the generator voltages as a function of a reference signal generated by reference signal generator 19. An end stop control 37 overrides the positive and negative bank firing pulse controls 15' and 17' under certain conditions to either prevent or force the generation of firing pulses. The end stop control disclosed in the commonly owned, copending application Ser. No. 95,803 filed concurrently herewith is hereby incorporated by reference into this application for the purpose of disclosing a suitable end stop control arrangement. The end stop control 37 generates a rectification end stop which prevents firing of the thyristors too early and an inversion end stop which forces generation of a firing pulse if the firing pulse control does not generate a firing pulse by a certain phase angle with respect to the source voltages. The cycloconverter of FIG. 4 also includes a fundamental output current detector 39 which provides to the positive and negative bank firing pulse generators 15' and 17' an indication of which thyristor bank is carrying the load current at any given instant. This determination can be made by the prior art methods of establishing the instants of zero crossing of the load current. U.S. Pat. No. 3,852,654 discloses a preferred arrangement for making this determination and is hereby incorporated by reference into this application for the purpose of disclosing a complete system. The appropriate apparatus is represented schematically as a current transformer 41 which monitors the output $I_{OF}$ and the block 39.

Figure 5:
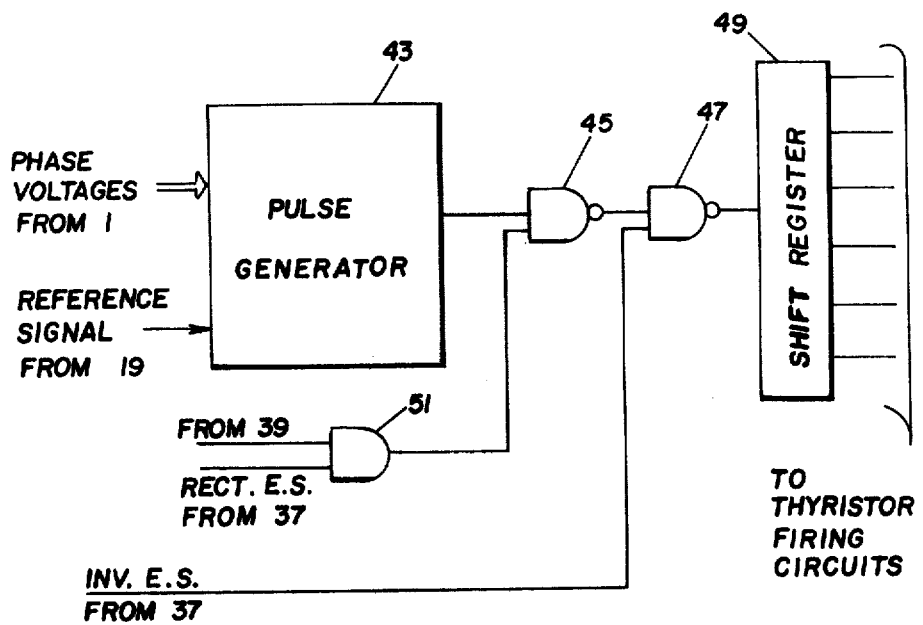
FIG. 5 is a schematic diagram illustrating one arrangement for the firing pulse generators shown in FIG. 4.

FIG. 5 illustrates the pertinent portions of the positive bank firing pulse generator 15', including a pulse generator 43 which generates pulses phase related to the voltages of the generator 1 as a function of the reference signal generated by the reference signal generator 19. These pulses may be generated by the prior art methods of firing pulse control such as the cosine wave crossing control or the various integral controls.

The pulses generated by the pulse generator 43 are applied through NAND elements 45 and 47 to the shift register 49. The NAND element 45 is gated by AND 51 to which is applied the rectification end stop signal from end stop control 37 and a signal from the fundamental output current detector 39 indicating which bank is carrying the load current. The NAND element 47 is gated by the inversion end stop. These logic elements subject the pulse generator 43 to the overriding control of the end stop control 37 and the fundamental output current detector 39. When the positive bank is not carrying the load current, the signal applied by the fundamental output current detector 39 to AND 51 will be high. The rectification end stop signal which is also applied to AND 51 will remain low to prevent passing of a pulse from the pulse generator 43 to the shift register 49 until a predetermined minimum phase angle for the next source voltage to be gated is detected by the end stop control 37. When this minimum phase angle is reached, the rectification end stop signal goes high so that any pulse generated by the pulse generator 43 will be applied to the shift register 49. If a firing pulse has not been generated by a certain phase angle determined by the end stop control, the inversion end stop signal goes low to clock the shift register. So far this is the normal operation of an end stop control. When the positive bank is not carrying the load, however, the signal to AND 51 from the fundamental output current detector goes low to force clocking of the shift register by the inversion end stop. Thus the converter operates under normal end stop override control for the load carrying bank, but solely under inversion end stop control for the nonload carrying bank.

The shift register 49 generates trigger signals sequentially on lines 53 for the firing circuits (not shown) of thyristors in the positive bank as the shift register is clocked by the pulse generator 43 or the inversion end stop. If desired, appropriate pulse shaping (not shown) can be applied to the shift register clocking pulses.

Figure 6:
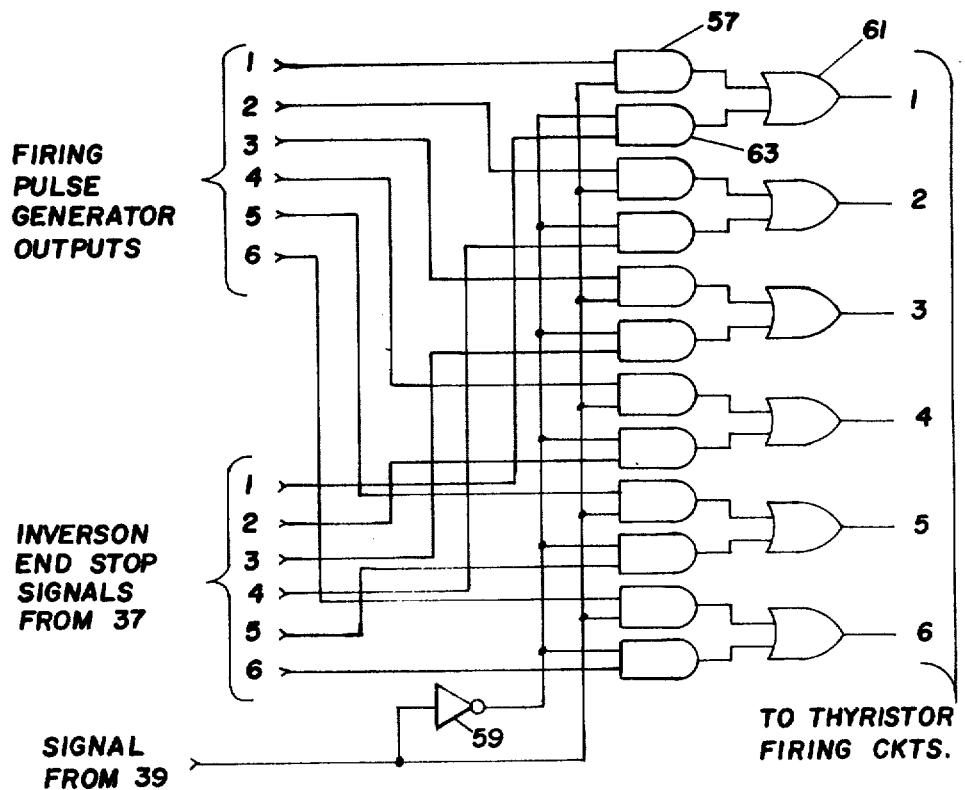
FIG. 6 is a schematic diagram illustrating another arrangement for the firing pulse generators shown in FIG. 4.

Alternatively, the inversion end stop signals can be integrated with the firing pulses generated by the firing pulse generator in the manner shown in FIG. 6. In this arrangement, each of the outputs from the shift register of firing pulse generator 15' is applied to an AND gate 57 together with the signal from the fundamental output current detector 39. The output of each AND 57 is applied to an OR gate 61 connected to the firing circuit for the associated thyristor. Each of the ORs 61 can also be gated by the output of an AND 63 to which is applied the associated inversion end stop and the output of an inverter 59 to which the signal from the fundamental output current detector 39 is applied. When the bank shown is carrying the load current, the signal from the fundamental output current detector is high to block generation of a firing pulse by the associated inverstion end stop while allowing the pulses generated by the firing pulse generator to pass to the thyristor firing circuits. On the other hand, when the output from the fundamental output current detector goes low indicating that the bank illustrated is not carrying the load current, pulses from the firing pulse generator are blocked and only the inversion end stop signals can fire the thyristors. Normal end stop control for the load carrying bank can be effected through prior art modification of the firing pulse phase angle.

The effect of using the inversion end stop signals to fire the thyristors in the nonload carrying bank is illustrated in waveform (a) of FIG. 3. As shown, the voltage $V_{ES}$ produced in the nonload carrying bank by the associated inversion end stop is the maximum voltage that can be generated by the converter and the nonload carrying bank is clearly biased off.

The effect of adding the half wave bias signal to the reference signal applied to the firing pulse generator for the nonload carrying bank and of using the inversion end stop to generate firing pulses in the nonload carrying thyristor bank as taught by this invention is to retard the firing pulses to the nonload carrying bank. This assures that the circulating current will be reduced or eliminated. By retarding the firing pulses only to the nonload carrying bank, these results are achieved without increasing output distortion and without the need for an overall cycloconverter feedback loop.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of synthesizing an output waveform from a multiphase AC voltage source comprising the steps of:

generating firing pulses to sequentially fire a plurality of thyristors arranged in positive and negative banks in a naturally commutated power circuit inserted between the AC voltage source and a load;

determining which bank of thyristors is carrying the load current; and retarding the firing pulses to the nonload current carrying bank independently of the timing of the firing pulses to the other bank to reduce the circulating current in the thyristor banks.

2. The method of claim 1 wherein said firing pulses are generated as a function of a reference voltage to produce an output waveform which follows said reference voltage and wherein the step of retarding the firing pulses to said nonload carrying bank includes generating a bias signal, and when generating the firing pulses for the nonload carrying bank summing said bias signal with said reference signal in a sense which retards said firing pulses.

3. The method of claim 2 wherein said bias signal is generated by half wave rectification of the output current waveform.

4. The method of claim 3 wherein separate positive and negative half wave rectified bias signals are generated and wherein for each half cycle of the load current the half wave rectified bias signal having a magnitude greater than zero is summed with the reference signal in a sense to generate a retarded firing pulse for the nonload carrying thyristor bank and the other bias signal is summed with said reference signal to retard the firing pulse when generating firing pulses for said other bank when it is not carrying the load current.

5. The method of claim 1 including the step of generating inversion end stop signals to force generation of a firing signal for a thyristor when one has not occurred by a predetermined instant related to the phase of the associated source voltage and generating firing pulses for the thyristors in the nonload carrying bank solely in response to said end stop signals.

6. A static power converter for generating an output waveform from a multiphase AC source voltage, comprising:

a naturally commutated power circuit comprising a positive and a negative bank of thyristors connected across the AC voltage source;

control means for generating firing pulses to sequentially fire said thyristors to generate said output waveform;

detector means for determining which bank of thyristors is carrying the load current; and circulating current suppressor means responsive to said detector means and operative to modify the operation of said control means to retard the firing pulses to the thyristor bank not carrying the load current without affecting the timing of the firing pulses to the other bank.

7. The static power converter of claim 6 wherein said control means includes a reference signal generator and generates said firing pulses as a function of the reference signal to produce an output waveform with a mean value which follows said reference voltage, and wherein said circulating current suppressor means includes means for generating a bias signal and means for summing said bias signal with said reference signal in a sense which retards the firing pulses when generating firing pulses for the bank not carrying the load current.

8. The static power converter of claim 7 wherein said bias signal generating means includes means for generating the bias signal through half wave rectification of said output current waveform.

9. The static power converter of claim 7 wherein said bias signal generating means includes means for generating separate positive and negative half wave rectified bias signals from said output current waveform and wherein said summing means includes means for summing the half wave rectified bias signal having a magnitude greater than zero when the positive bank is the nonload carrying bank with said reference voltage for generating firing pulses for the positive bank of said thyristors and means for summing said other half wave rectified bias signal with the reference signal for generating firing pulses for the negative thyristor bank.

10. The static power converter of claim 6 including an end stop circuit which generates an inversion end stop signal which forces generation of a firing pulse for a particular thyristor if one has not been generated by the control means by the last suitable instant for natural commutation and wherein said circulating current suppressor includes means for modifying the operation of the control means to use said inversion end stop signal to generate the firing pulses for said nonload carrying bank of thyristors.

11. A cycloconverter for generating from a multiphase AC voltage source a desired output waveform to be applied to a load, said cycloconverter comprising:

a naturally commutated power circuit having positive and negative thyristor banks connected between the phases of said AC voltage source and the load for supplying the positive and negative half cycles of output current to the load;

means for generating a reference signal;

first and second control means for sequentially generating firing pulses for the thyristors in the positive and negative thyristor banks respectively at intervals determined as a function of the reference signal and the source voltages;

means for generating positive and negative half wave rectified bias signals from the output current; and means for summing the half wave rectified bias signal having a magnitude greater than zero when the output current is negative to the reference signal applied to said first control means and in a sense which retards the firing pulses generated by the first control means and means for summing the other half wave rectified bias signal with the reference signal applied to the second control means in a sense which retards the firing pulses generated by the second control means.

* * * * *